3,015,542
METHOD OF PREPARING HYDRAZINE HYDRATE FROM DIHYDRAZINE SULFATE
Erich Rahlfs, Leverkusen-Bayerwerk, and Günter Henrich, Opladen, Germany, assignors to Farbenfabriken Bayer Aktiengesellschaft, Leverkusen, Germany, a corporation of Germany
No Drawing. Filed Oct. 7, 1959, Ser. No. 844,857
Claims priority, application Germany Oct. 13, 1958
7 Claims. (Cl. 23—190)

Processes for the conversion of hydrazine sulphate to ammonium sulphate and anhydrous hydrazine with pure ammonia are known. It is difficult to handle anhydrous hydrazine and expensive precautionary measures are required, whereas the substantially less harmful hydrazine hydrate or its aqueous solution are sufficient for most purposes.

The present invention is concerned with a process for the preparation of hydrazine hydrate from monohydrazine or dihydrazine sulphate and ammonia in the presence of water. The process consists in that an aqueous suspension or solution of hydrazine sulphate has added thereto, at temperatures below approximately 20° C., such a quantity of ammonia that the main quantity of the sulphuric acid precipitates as ammonium sulphate. The separation of the residual sulphuric acid can be effected in various ways. If it is desired not to use pressure, then after removing the ammonium sulphate an alkali, such as sodium hydroxide, can be added to the remaining solution in a quantity at least equivalent to the sulphuric acid residue, and the alkali sulphate can be removed either by once again saturating with ammonia, by precipitating with a low alcohol or even by evaporating to dryness.

On the other hand, the precipitation of the ammonium sulphate can also be continued by applying pressure and in this way, by raising the concentration of ammonia, the sulphuric acid is almost completely removed.

In all cases, the separation of the hydrazine hydrate from the vapour phase is effected in the usual manner by rectification.

The reaction of hydrazine sulphate with ammonia in the presence of water does not take place completely, even while cooling and using an excess of ammonia. If pressure is not applied, a considerable part of the sulphuric acid always remains in solution. Now it is not possible, as is otherwise usual in similar cases, to concentrate the solution after separating out the precipitated ammonium sulphate and thereupon again to precipitate the ammonium sulphate with ammonia. This is because it is mainly ammonia and water which evaporate during the concentration by evaporation, so that the concentration of hydrazine in the concentrated solution increases considerably. Evaporation to dryness is only possible while maintaining certain precautionary measures, since hydrazine sulphate decomposes exothermally at elevated temperatures.

However, if an alkali such as sodium hydroxide solution is added to the solution, at least in a quantity equivalent to the dissolved sulphuric acid, then the volatile constituents can be completely driven off, leaving the anhydrous alkali sulphate. The driving off of the hydrazine is further assisted if a small excess of alkali is used.

Evaporation to dryness can be carried out even more easily if the quantity of the solid residue is as small as possible. Depending on the prevailing conditions, it is consequently desirable to precipitate the main quantity of the alkali sulphate by means of a readily volatile alcohol such as methanol or ethanol before the evaporation process is started. The same effect can however also be obtained if the solution is again saturated with ammonia after adding alkali.

It has further been found that the removal of the sulphuric acid can also be carried out in a single operation if, in the precipitation of the ammonium sulphate, the ammonia concentration is increased by applying pressure, such as from 2 to 10 atm., and low temperatures between about —20 and 0° C. In this way, the $NH_3$ is caused to act on the hydrazine sulphate solution at for example a pressure of 5 atm. and at a temperature of less than 0° C. By this means, the sulphuric acid is practically completely removed as ammonium sulphate.

The invention is further illustrated by the following examples without being restricted thereto.

*Example 1*

81 g. of dihydrazine sulphate (containing 49 g. of sulphuric acid) were dissolved in 56.5 g. of water and the solution was saturated at 0° C. with ammonia. 60 g. of ammonium sulphate (containing 44.6 g. of sulphuric acid) were precipitated. The filtered solution contained 50 g. of hydrazine hydrate and 4.4 g. of sulphuric acid as well as ammonia and water. 2.3 g. of sodium hydroxide were added to this solution, which was then evaporated to dryness. Water, ammonia and hydrazine hydrate were separated by rectification of the vapours.

*Example 2*

81 g. of dihydrazine sulphate (with 49 g. of sulphuric acid) were dissolved in 56.5 g. of water and the solution saturated at 0° C. with ammonia. 60 g. of ammonium sulphate precipitated (with 44.6 g. of sulphuric acid); the filtered solution contained 50 g. of hydrazine hydrate (and 4.4 g. of sulphuric acid) as well as ammonia and water. After separating out the ammonium sulphate, the solution was freed from ammonia and 2.3 g. of sodium hydroxide and 300 ml. of ethyl alcohol were added thereto. The major part of the residual sulphuric acid precipitated as sodium sulphate, and after separation thereof, the solution still contained 0.08 g. of sulphuric acid as well as 50 g. of $N_2H_2 \cdot H_2O$. After evaporation to dryness, the vapours were separated by rectification.

*Example 3*

81 g. of dihydrazine sulphate (with 49 g. of sulphuric acid) were dissolved in 56.5 g. of water and the solution saturated with ammonia at a pressure of 5 atm. and at a temperature of —10° C. 66 g. of ammonium sulphate precipitated. The filtered solution consisted of 50 g. of hydrazine hydrate, 38 g. of water, 260 g. of ammonia and 0.05 g. of sulphuric acid.

After releasing the pressure, the volatile components were separated by rectification of the vapours.

We claim:
1. A process for the preparation of hydrazine hydrate from ammonia and dihydrazine sulfate in the presence of water, which comprises saturating a mixture of dihydrazine sulfate and water at a temperature below about 20° C. with ammonia to thereby precipitate ammonium sulfate, filtering off the solution and recovering hydrazine hydrate from said solution by distillation.

2. Process according to claim 1, which comprises effecting said saturation at a temperature between —20° C. and 0° C. and at a pressure of between 2 and 10 atmospheres.

3. Process according to claim 1, which comprises adding to said solution filtered off from the precipitated ammonium sulfate an alkali metal hydroxide in a quantity at least equivalent to the quantity of sulphuric acid remaining in said solution prior to recovering hydrazine hydrate therefrom.

4. Process according to claim 3, which comprises saturating with ammonia said solution containing alkali metal hydroxide to thereby precipitate alkali metal sulfate therefrom, filtering off the solution and recovering hydrazine hydrate from said solution by distillation.

5. Process according to claim 3, which comprises adding to said solution containing alkali metal hydroxide a readily volatile alcohol, thereby precipitating alkali metal sulfate, filtering off the solution and recovering hydrazine hydrate from said solution by distillation.

6. Process according to claim 4, in which said alkali metal hydroxide is sodium hydroxide.

7. Process according to claim 5, in which said volatile alcohol is ethyl alcohol.

References Cited in the file of this patent

UNITED STATES PATENTS

| | | |
|---|---|---|
| 2,680,672 | Taylor | June 8, 1954 |
| 2,680,673 | Clark | June 8, 1954 |

OTHER REFERENCES

Audrieth and Ogg: "The Chemistry of Hydrazine," John Wiley and Sons, Inc., New York, 1951, pages 170–172.